United States Patent [19]
Lee

[11] Patent Number: 5,797,726
[45] Date of Patent: Aug. 25, 1998

[54] TURBULATOR CONFIGURATION FOR COOLING PASSAGES OR ROTOR BLADE IN A GAS TURBINE ENGINE

[75] Inventor: Ching-Pang Lee, Cincinnati, Ohio

[73] Assignee: General Electric Company, Cincinnati, Ohio

[21] Appl. No.: 778,595

[22] Filed: Jan. 3, 1997

[51] Int. Cl.⁶ ............................................. F04D 29/58
[52] U.S. Cl. ................................ 416/96 R; 416/97 R
[58] Field of Search ........................ 416/95 R, 96 R, 416/97 R

[56] References Cited

U.S. PATENT DOCUMENTS

| | | | |
|---|---|---|---|
| 4,416,585 | 11/1983 | Abdel-Messeh | 416/95 |
| 4,514,144 | 4/1985 | Lee | 416/96 R |
| 5,156,526 | 10/1992 | Lee et al. | 416/97 R |
| 5,165,852 | 11/1992 | Lee et al. | 416/97 R |
| 5,423,608 | 6/1995 | Chyou et al. | 366/337 |
| 5,536,143 | 7/1996 | Jacala et al. | 416/96 R |

*Primary Examiner*—John T. Kwon
*Attorney, Agent, or Firm*—Andrew C. Hess; Patrick R. Scanlon

[57] ABSTRACT

A turbulator configuration is formed on an inner surface of one or more walls defining a cooling passage in a rotor blade of a gas turbine engine, where the cooling passage has a centerline extending therethrough. The turbulator configuration includes a plurality of spaced turbulator pairs oriented with respect to the centerline so that the direction of a boundary layer flow of the coolant adjacent the cooling passage inner surface is consistent with a pair of counter-rotating flow circulations created by Coriolis forces on the coolant flowing into and through the cooling passage when the rotor blade is rotated, whereby heat transfer between the coolant and the wall is enhanced. The turbulator pairs are angled either toward or away from the centerline for leading and trailing walls of the cooling passage depending upon whether the coolant is flowing either radially outward or radially inward.

8 Claims, 4 Drawing Sheets

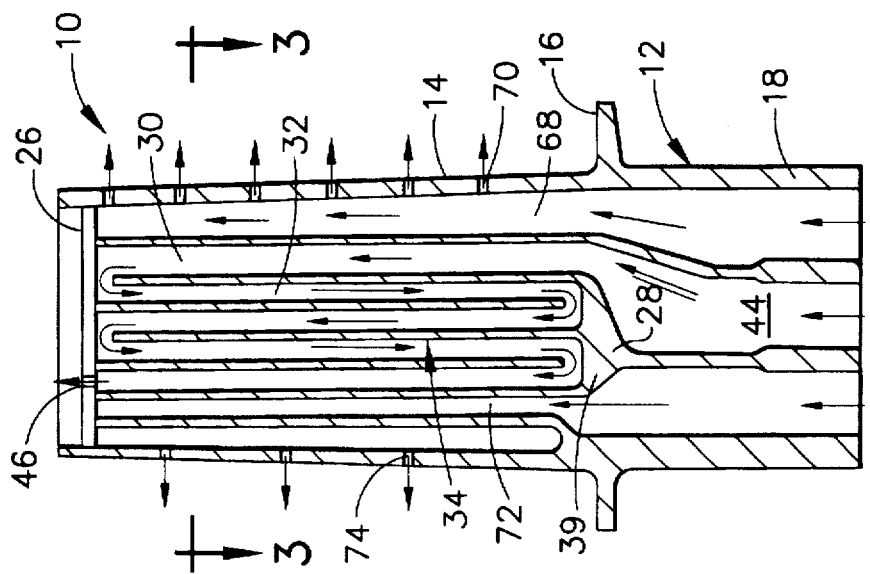
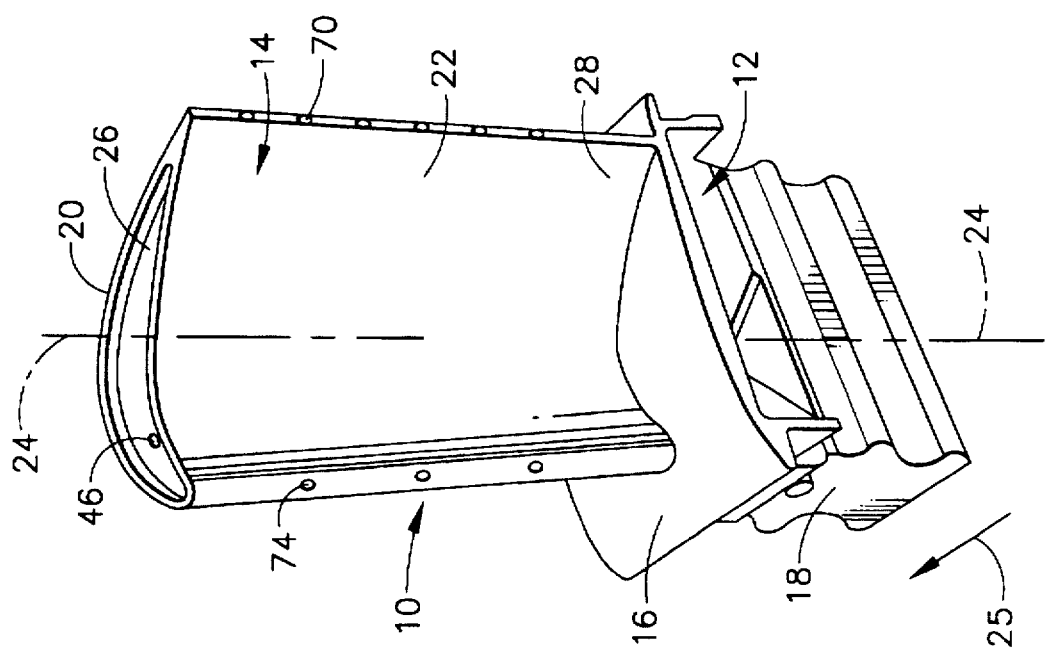

TURBULATOR CONFIGURATION FOR COOLING PASSAGES OR ROTOR BLADE IN A GAS TURBINE ENGINE

BACKGROUND OF THE INVENTION

1. Field of the Invention

The present invention relates generally to internal cooling of rotor blades in a gas turbine engine and, in particular, to a turbulator configuration positioned along the inner surface of at least one wall defining a cooling passage in such a rotor blade which takes advantage of the Coriolis forces generated during rotation.

2. Description of Related Art

Gas turbine engines, such as aircraft jet engines, include components (e.g., turbines, compressors, fans and the like) having rotor blades. A turbine rotor blade, for example, has a shank portion which is attached to a rotating turbine rotor disk and an airfoil blade portion which is employed to extract useful work from the hot gases exiting the engine's combustor. The airfoil blade includes a blade root which is attached to the shank and a blade tip which is the free end of the airfoil blade. Modern aircraft jet engines have employed internal cooling of turbine rotor blades to keep the airfoil blade temperatures within certain design limits. Typically, the airfoil blade portion of the turbine rotor blade is cooled by air (normally bled from the engine's compressor) passing through a longitudinally extending internal passage, with the air entering near the airfoil blade root and exiting near the airfoil blade tip. Known turbine blade cooling passages include a cooling circuit comprising a plurality of unconnected longitudinally-oriented passages, where each passage receives cooling air from near the airfoil blade root and channels the air longitudinally toward the airfoil blade tip, as well as a serpentine cooling circuit comprising a plurality of longitudinally-oriented passages which are series-connected to produce serpentine flow. For either cooling circuit, some air exits the airfoil blade through film cooling holes near the airfoil blade's leading edge and some air exits the airfoil blade through trailing edge cooling holes.

Cooling passages typically have circular, rectangular, square or oblong transverse cross-sectional shapes. It is known that for a rotating airfoil blade having a serpentine cooling circuit including longitudinally-oriented cooling passages of square cross-sectional shape, Coriolis (rotation) forces will increase the heat transfer coefficient along certain walls of the passage and decrease the heat transfer coefficient along other walls of the passage as compared with a non-rotating airfoil. Basically, the Coriolis force is proportional to the vector cross product of the velocity vector of the coolant flowing through the passage and the angular velocity vector of the rotating airfoil blade. The Coriolis force compresses the coolant against one side of the square passage increasing the heat transfer at that side while decreasing the heat transfer at the opposite side. This creates an uneven transverse cross section blade temperature profile which creates hot areas that must be compensated for by, for example, increasing the cooling flow. Increasing the cooling flow could be accomplished by bleeding off more engine compressor air, but this would reduce the engine's efficiency by reducing the number of miles flown for each gallon of fuel consumed.

Turbulence promoters or turbulators are devices commonly used in the cooling flow passages of rotor blades to break the thermal boundary layer and generate turbulence near the cooling passage wall. In this way, heat transfer between the coolant and the wall is enhanced. It is understood that the height and shape of the turbulators (heretofore rectangular or square ribs cast on the cooling passage wall identical in cross-section and spacing) are critical to the effectiveness of the turbulence generation. In particular, the turbulator height must be greater than the thickness of the thermal boundary layer in order to trip it.

Accordingly, it is desired that a turbulator configuration for integration with cooling passages in rotor blades of a gas turbine engine be developed which complements the effects of Coriolis forces on the cooling passage walls.

SUMMARY OF THE INVENTION

In accordance with one aspect of the present invention, a turbulator configuration is formed on an inner surface of one or more walls defining a cooling passage in a rotor blade of a gas turbine engine, said cooling passage having a centerline extending therethrough. The turbulator configuration includes a plurality of spaced turbulator pairs oriented with respect to the centerline so that the direction of a boundary layer flow of the coolant adjacent the cooling passage inner surface is consistent with a pair of counter rotating flow circulations created by Coriolis forces on the coolant flowing into and through the cooling passage when the rotor blade is rotated, whereby heat transfer between the coolant and the wall is enhanced. The turbulator pairs are angled either toward or away from the centerline for leading and trailing walls of the cooling passage depending upon whether the coolant is flowing either radially outward or radially inward.

In accordance with a second aspect of the present invention, a rotor blade for a gas turbine engine is disclosed as including a shank portion and an airfoil blade portion. The airfoil blade portion further includes a pressure side, a suction side, where the pressure and suction sides are joined together to form an airfoil shape, a blade root attached to the shank portion, a blade tip, and a longitudinal axis extending outward toward the blade tip and inward toward the blade root. A cooling passage is also formed in the airfoil blade portion which extends generally longitudinally and is defined by at least a leading wall and a trailing wall. The leading and trailing walls of such cooling passage have integrated with an inner surface thereof a plurality of spaced turbulator pairs angled with respect to a centerline therethrough so that boundary layer flow of coolant adjacent the inner surfaces is directed in the same direction as counter-rotating circulations of coolant flow created by Coriolis forces during rotation of the rotor blade. The turbulator pairs are angled either toward or away from the centerline on the leading and trailing walls depending on whether the flow of coolant is radially outward or radially inward.

BRIEF DESCRIPTION OF THE DRAWING

While the specification concludes with claims particularly pointing out and distinctly claiming the present invention, it is believed the same will be better understood from the following description taken in conjunction with the accompanying drawing in which:

FIG. 1 is a perspective view of a rotor blade for a gas turbine engine;

FIG. 2 is a longitudinal cross-sectional view of the rotor blade depicted in FIG. 1;

3

Figure 3:
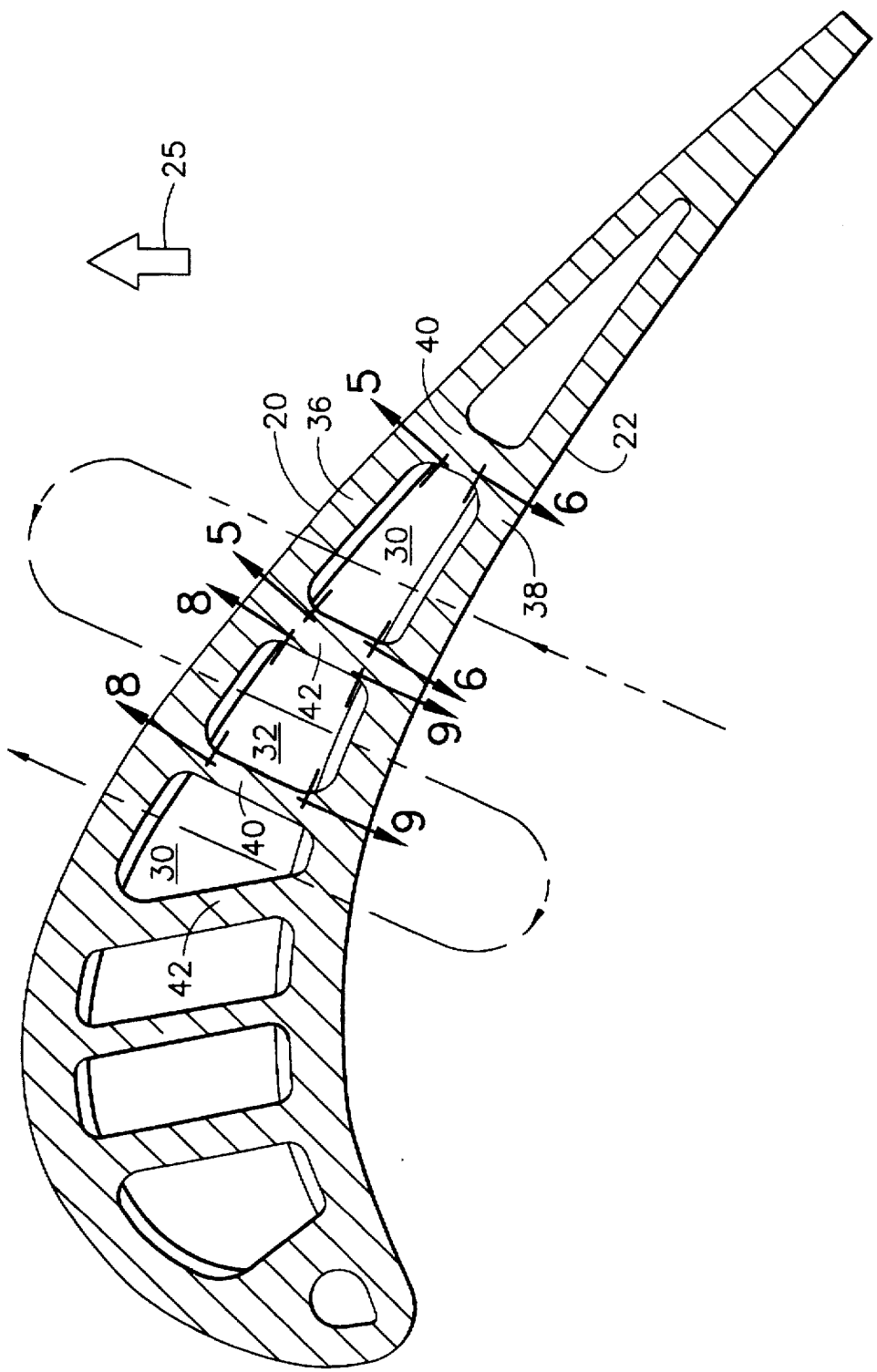
FIG. 3 is an enlarged cross-sectional view of the airfoil blade portion of the rotor blade depicted in FIG. 1 taken along line 3—3 of FIG. 2.
Figure 4:
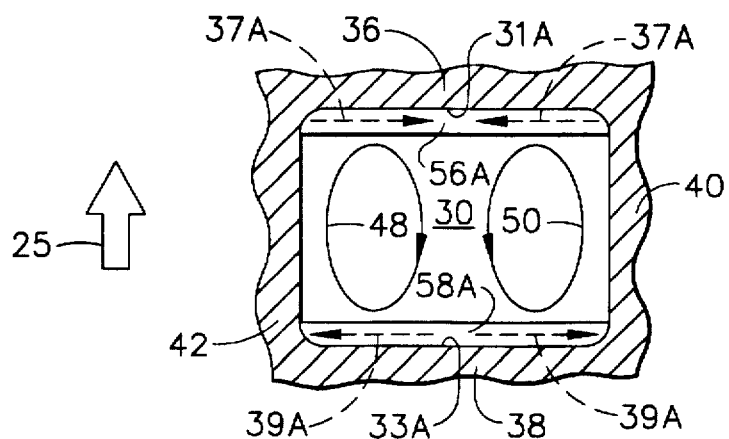
Figure 5:
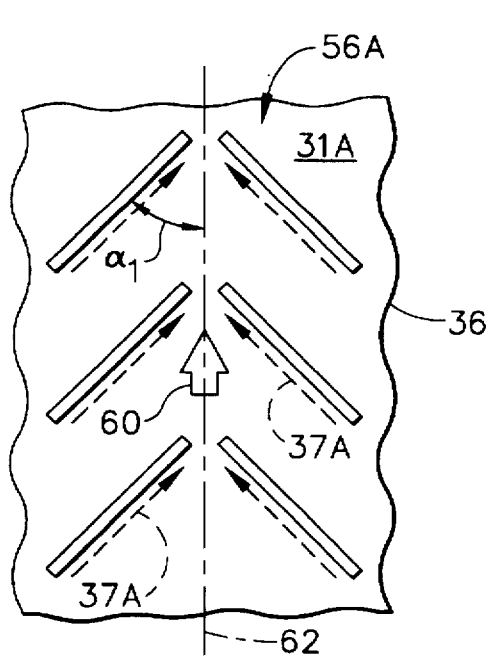
Figure 6:
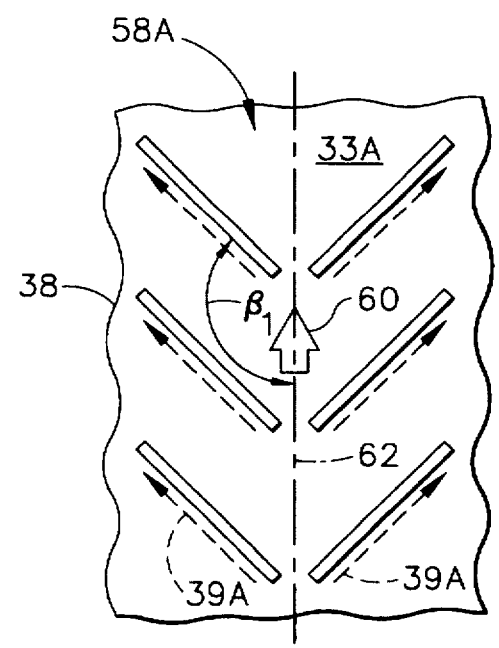
Figure 7:
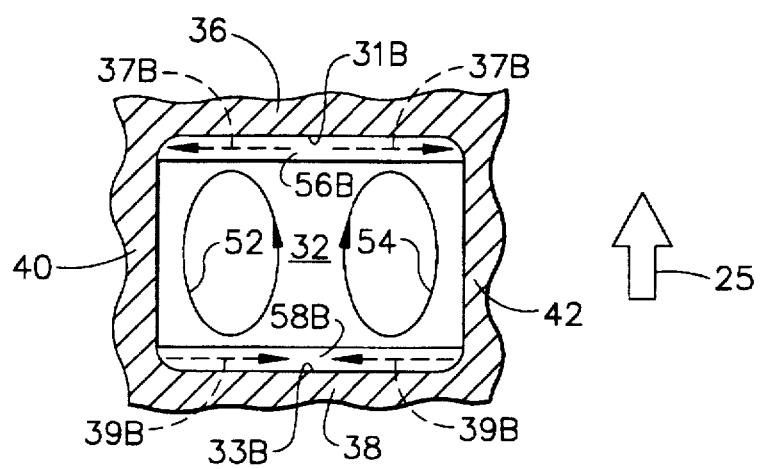
Figure 8:
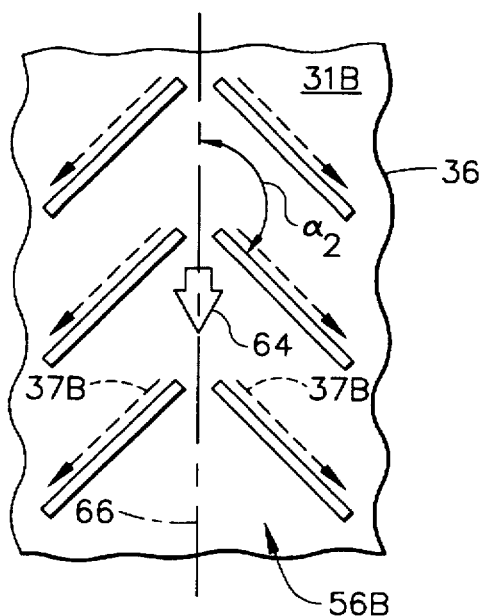
Figure 9:
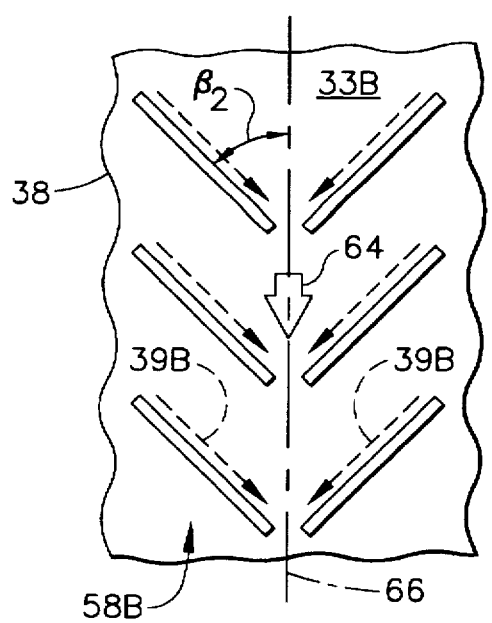

FIG. 4 is a partial cross-sectional view of the airfoil blade depicted in FIG. 3, where the direction of the air flow through the cooling passage is radially outward;

FIG. 5 is a partial sectional view of the cooling passage depicted in FIG. 4 taken through line 5—5 of FIG. 3, where a turbulator configuration in accordance with the present invention is shown on the leading wall of the airfoil blade;

FIG. 6 is a partial sectional view of the cooling passage depicted in FIG. 4 taken through line 6—6 of FIG. 3, where a turbulator configuration in accordance with the present invention is shown on the trailing wall of the airfoil blade;

FIG. 7 is a partial cross-sectional view of the airfoil blade depicted in FIG. 3, where the direction of the air flow through the cooling passage is radially inward;

FIG. 8 is a partial sectional view of the cooling passage depicted in FIG. 7 taken through line 8—8 of FIG. 3, where a turbulator configuration in accordance with the present invention is shown on the leading wall of the airfoil blade; and FIG. 9 is a partial sectional view of the cooling passage depicted in FIG. 7 taken through line 9—9 of FIG. 3, where a turbulator configuration in accordance with the present invention is shown on the trailing wall of the airfoil blade.

DETAILED DESCRIPTION OF THE INVENTION

Referring now to the drawing in detail, wherein identical numerals indicate the same elements throughout the figures, FIG. 1 depicts a gas turbine engine rotor blade 10 (e.g., an aircraft jet engine turbine rotor blade). Rotor blade 10 includes a shank 12 and an airfoil blade 14. Shank 12 further includes a blade platform 16, which helps to radially contain the turbine air flow, and a dovetail 18, which attaches to a turbine rotor disk (not shown). Airfoil blade 14 has a convex-shaped suction side 20 and a concave-shaped pressure side 22 which are joined together to define an airfoil shape. A longitudinal axis 24 extends radially outward toward a blade tip 26 and radially inward toward a blade root 28 which is attached to shank 12. Rotor blade 10 rotates in a direction such that airfoil blade pressure side 22 follows airfoil blade suction side 20. Thus, as shown in FIGS. 1, 3, 4, and 7, the direction of rotation for rotor blade 10 is depicted by an arrow 25.

As seen in FIGS. 2 and 3, airfoil blade 14 includes a plurality of generally longitudinally extending internal cooling passages 30 and 32 which direct the flow of cooling air or coolant toward and away from blade tip 26 (or radially outward and radially inward), respectively. Cooling passages 30 and 32 are preferably disposed in a row with adjacent passages interconnected to define at least a portion of a serpentine coolant circuit 34. It will be seen in FIG. 3 that each of passages 30 and 32 has a unique cross-section, ranging from substantially rectangular to nearly trapezoidal, although the crosssection of such cooling passages 30 and 32 may have any shape. In the present airfoil blade shown and described, however, cooling passages 30 and 32 are substantially quadrilateral in shape with two pairs of opposing walls. A first pair of opposing walls 36 and 38 (which are also known as the leading and trailing walls) conform substantially in direction to suction side 20 and pressure side 22, respectively, of airfoil blade 14. A second pair of opposite walls 40 and 42 join leading wall 36 and trailing wall 38 so as to form each passage 30 and 32. It will be recognized that cooling passages 30 and 32 of serpentine coolant circuit 34 receive coolant from an inlet 44 in shank 12. After coursing through cooling passages 30 and 32, the coolant exits airfoil blade 14 through holes 46 in blade tip 26.

4

As seen in FIGS. 2–4, the flow of coolant through cooling passages 30 is in a radially outward direction with respect to longitudinal axis 24, whereas the flow of coolant through cooling passages 32 is in a radially inward direction. During operation of the gas turbine engine containing rotor blade 10, the air flowing inside cooling passages 30 and 32 is subjected to a rotational force. The interaction of the radial flow through cooling passages 30 and 32 and this rotation results in what is known as a Coriolis force which creates internal flow circulation in passages 30 and 32. As seen in FIGS. 4 and 7, the direction of the flow circulation is dependent upon the direction of the radial flow (i.e., whether it is radially outward or radially inward with respect to longitudinal axis 24). FIG. 4 depicts schematically a pair of counter rotating circulations 48 and 50 created by the Coriolis force in passage 30 which moves the fluid from leading wall 36 to trailing wall 38. In contrast, FIG. 7 depicts schematically a pair of counter-rotating circulations 52 and 54 created by the Coriolis force in passage 32 which moves the fluid from trailing wall 38 to leading wall 36.

The use of turbulators to interrupt a boundary layer flow along the walls of a cooling passage, as well as generate turbulence inside the boundary layer to promote heat transfer between the fluid and the walls, is well known. It is also known that angled turbulators are able to direct the boundary layer flow along the orientation thereof, as exemplified by U.S. Pat. No. 4,514,144 to Lee (which is also owned by the assignee of the present invention and is hereby incorporated by reference). As seen therein, however, all the turbulators on each wall are angled in the same direction with respect to a centerline through the cooling passage since the intention was to prevent dust from accumulating against the upstream side of such turbulators.

In accordance with the present invention, a new turbulator configuration is provided in which a plurality of longitudinally spaced turbulator pairs 56 and 58 are integrated with inner surfaces 31 and 33 of leading and trailing walls 36 and 38, respectively, of cooling passages 30 and 32. More specifically, FIG. 5 depicts turbulator pairs 56A positioned on inner surface 31A of leading wall 36 and FIG. 6 depicts turbulator pairs 58A positioned on inner surface 33A of trailing wall 58 for cooling passage 30. It will be noted that the radial flow of air 60 through cooling passage 30 is toward blade tip 26. Because the Coriolis force in cooling passage 30 creates circulations 48 and 50 therein from leading wall 36 to trailing wall 38, turbulator pairs 56A on inner surface 31A of leading wall 36 are oriented so as to be angled toward a centerline 62 therethrough (angle $\alpha_1$ in FIG. 5 preferably being in the range of approximately 30°–60° with respect to centerline 62) and turbulator pairs 58A on inner surface 33A of trailing wall 38 are oriented so as to be angled away from centerline 62 (angle $\beta_1$ in FIG. 6 preferably being in the range of approximately 120°–150° with respect to centerline 62). In this way, thermal boundary layer flow (depicted by arrows 37A and 39A, respectively) along leading and trailing walls 36 and 38 is directed in a manner consistent with circulations 48 and 50. Therefore, the Coriolis force enhances the fluid motion inside such boundary layer flows and consequently the heat transfer between the fluid and walls 36 and 38.

Similarly, FIG. 8 depicts turbulator pairs 56B positioned on inner surface 31B of leading wall 36 and FIG. 9 depicts turbulator pairs 58B positioned on inner surface 33B of trailing wall 38 for cooling passage 32. It will be noted that the radial flow of air 64 through cooling passage 32 is away from blade tip 26. Because the Coriolis force in cooling passage 32 creates circulations 52 and 54 therein from trailing wall 38 to leading wall 36, turbulator pairs 56B on inner surface 31B of leading wall 36 are oriented so as to be angled away from centerline 66 (angle $\alpha_2$ in FIG. 8 preferably being in the range of approximately 120°–150° with respect to centerline 66) and turbulator pairs 58B on inner surface 33B of trailing wall 38 are oriented so as to be angled toward centerline 66 (angle $\beta_2$ in FIG. 9 preferably being in the range of approximately 30°–60° with respect to centerline 66). As in the case of cooling passage 30 above, thermal boundary layer flow (depicted by arrows 37B and 39B, respectively) along leading and trailing walls 36 and 38 is directed in a manner consistent with circulations 52 and 54. Therefore, the Coriolis force also enhances the fluid motion inside the boundary layer flow of cooling passage 32 and heat transfer between the fluid and walls 36 and 38.

It will be seen from FIGS. 5, 6, 8, and 9 that turbulator pairs 56 and 58 are preferably made up of ribs positioned substantially symmetrically on each side of centerlines 62 and 66, respectively, with a flow path provided therebetween. Although not shown, such ribs need not be solid in all applications and each turbulator may be comprised of spaced rib segments, cylinders, or the like. Thus, the particular design or shape of the turbulators provided for turbulator pairs 56 and 58 is not integral to the present invention and should not otherwise be considered limiting.

Although not a part of the present invention, rotor blade 10 also includes trailing edge and leading edge cooling circuits with coolant entering a trailing edge conduit 68 and exiting through trailing edge openings 70 and with coolant entering a leading edge conduit 72 and exiting through leading edge film cooling hole openings 74.

Having shown and described the preferred embodiment of the present invention, further adaptations of the turbulator configuration for cooling passages in a rotor blade can be accomplished by appropriate modifications by one of ordinary skill in the art without departing from the scope of the invention.

What is claimed is:

1. In a cooling passage of a rotor blade for a gas turbine engine, said cooling passage being substantially quadrilateral in cross-section and including a leading wall and a trailing wall with respect to rotation of said rotor blade and a centerline extending therethrough, a turbulator configuration, comprising:

(a) a plurality of spaced turbulator pairs positioned on an inner surface of said leading wall and angled with respect to said centerline, wherein said leading wall turbulator pairs are angled toward said centerline when coolant flows radially outward through said cooling passage and are angled away from said centerline when coolant flows radially inward through said cooling passage; and (b) a plurality of spaced turbulator pairs positioned on an inner surface of said trailing wall and angled with respect to said centerline, wherein said trailing wall turbulator pairs are angled away from said centerline when coolant flows radially outward through said cooling passage and are angled toward said centerline when coolant flows radially inward through said cooling passage;

whereby said turbulator configuration is consistent with the direction of counter-rotating flow circulations experienced by said leading and trailing walls of said cooling passage caused by Coriolis forces on said coolant flowing therethrough.

2. The turbulator configuration of claim 1, wherein said turbulator pairs of said leading and trailing walls are substantially symmetrically arranged with respect to said centerline.

3. The turbulator configuration of claim 1, wherein said turbulator pairs of said leading and trailing walls are angled with respect to said centerline in a range of approximately 30°–60° when angled toward said centerline.

4. The turbulator configuration of claim 1, wherein said turbulator pairs of said leading and trailing walls are angled with respect to said centerline in a range of approximately 120°–150° when angled away from said centerline.

5. The turbulator configuration of claim 1, wherein each turbulator of said turbulator pair further comprises a rib.

6. The turbulator configuration of claim 1, wherein each turbulator of said turbulator pair further comprises a plurality of spaced rib segments.

7. The turbulator configuration of claim 1, wherein a flow path exists between each said turbulator pair.

8. A rotor blade for a gas turbine engine, comprising:

(a) a shank portion; and (b) an airfoil blade portion, said airfoil blade portion further comprising:

(1) a pressure side;

(2) a suction side, said pressure and suction sides being joined together to form an airfoil shape;

(3) a blade root attached to said shank portion;

(4) a blade tip;

(5) a longitudinal axis extending outward toward said blade tip and inward toward said blade root; and (6) a cooling passage extending generally longitudinally and being defined by at least a leading wall and a trailing wall, said leading and trailing walls having integrated with an inner surface thereof a turbulator configuration comprising:

(a) a plurality of spaced turbulator pairs positioned on said leading wall inner surface and angled with respect to a centerline through said cooling passage, wherein said turbulator pairs of said leading wall are angled toward said centerline when the flow of coolant is radially outward in said cooling passage and angled away from said centerline when the flow of coolant is radially inward in said cooling passage; and (b) a plurality of spaced turbulator pairs positioned on said trailing wall inner surface and angled with respect to said centerline through said cooling passage, wherein said turbulator pairs of said trailing wall are angled away from said centerline when the flow of coolant is radially outward in said cooling passage and angled toward said centerline when the flow of coolent is radially inward in said cooling passage;

hereby boundary layer flow of coolant adjacent said inner surfaces of said leading and trailing walls is directed in the same direction as counter-rotating circulations of coolant flow created by Coriolis forces during rotation of said rotor blade.

* * * * *